(12) United States Patent
Roos et al.

(10) Patent No.: US 7,049,543 B2
(45) Date of Patent: May 23, 2006

(54) METHOD OF DEFINING FEATURES ON MATERIALS WITH A FEMTOSECOND LASER

(75) Inventors: Edward Victor Roos, Los Altos, CA (US); Franklin Roeske, Livermore, CA (US); Ronald S. Lee, Livermore, CA (US); Jerry J. Benterou, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/704,459

(22) Filed: Nov. 7, 2003

(65) Prior Publication Data

US 2005/0098546 A1    May 12, 2005

(51) Int. Cl.
*B23K 26/38* (2006.01)
(52) U.S. Cl. .................................. 219/121.69
(58) Field of Classification Search ........... 219/121.68, 219/121.69; 102/202.5
See application file for complete search history.

(56) References Cited

U.S. PATENT DOCUMENTS

| | | | |
|---|---|---|---|
| 4,862,803 A * | 9/1989 | Nerheim et al. .......... 102/202.5 |
| 4,908,493 A * | 3/1990 | Susemihl ............... 219/121.67 |
| 5,329,152 A | 7/1994 | Janai et al. |
| 5,656,186 A | 8/1997 | Mourou et al. |
| 5,717,699 A * | 2/1998 | Haag et al. .................. 714/725 |
| 6,150,630 A | 11/2000 | Perry et al. |
| 6,180,915 B1 | 1/2001 | Sugioka et al. |
| 6,268,586 B1 | 7/2001 | Stuart et al. |
| 6,333,485 B1 | 12/2001 | Haight et al. |
| 6,470,802 B1 * | 10/2002 | Neyer et al. ............. 102/202.5 |
| 6,552,301 B1 | 4/2003 | Herman et al. |
| 6,746,881 B1 * | 6/2004 | Charpentier et al. .......... 438/14 |
| 2002/0125230 A1 | 9/2002 | Haight et al. |
| 2003/0136769 A1 * | 7/2003 | Lin et al. ............... 219/121.69 |

FOREIGN PATENT DOCUMENTS

| | | | |
|---|---|---|---|
| JP | 7-100680 A | * | 4/1995 |
| JP | 2002-160079 A | * | 6/2002 |
| JP | 2003-133690 A | * | 5/2003 |
| WO | WO-02/060636 A | * | 8/2002 |
| WO | WO-2004/013900 A2 | * | 2/2004 |

* cited by examiner

*Primary Examiner*—Geoffrey S. Evans
(74) *Attorney, Agent, or Firm*—Michael C. Staggs; Alan H. Thompson

(57) ABSTRACT

The invention relates to a pulsed laser ablation method of metals and/or dielectric films from the surface of a wafer, printed circuit board or a hybrid substrate. By utilizing a high-energy ultra-short pulses of laser light, such a method can be used to manufacture electronic circuits and/or electro-mechanical assemblies without affecting the material adjacent to the ablation zone.

25 Claims, 4 Drawing Sheets

METHOD OF DEFINING FEATURES ON MATERIALS WITH A FEMTOSECOND LASER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to laser machining. More specifically, it pertains to a pulsed laser ablation method of films from the surface of a semi-conducting wafer, printed circuit board or a hybrid substrate and/or to the substrate without affecting the material adjacent to the ablation zone.

2. State of Technology

In defining films on electronic circuits, the present state-of-the-art process is to use a physical mask to define the metal or dielectric film by photolithographic processes. However, the use of such physical masks can produce non-uniformities in the desired structures of the films due to: undercutting of the metal films by required acid etching techniques, the requirement of a lift-off process because the dielectric film cannot be etched, films that require heating may result in a damaged photo-resist, and turn-around times for producing the physical mask being up to several weeks.

However, lasers may be utilized to overcome such problems and define such films on electronic circuits. Such lasers have previously been used to machine or cut a target comprised of a rigid material, such as metals, wood, rubber or plastics. Lasers machine or cut such materials by inducing a breakdown of the material through chemical and physical breakdown, vaporization, and ablation. Pulsed lasers have been utilized to selectively ablate material from such targets by outputting pulses of light having pulse durations of less than nanoseconds.

Accordingly, there is a need in industry for utilizing pulsed lasers, in particular, ultra-short pulsed lasers having temporal pulse durations of less than about 1 picosecond to define features on films arranged on substrates.

SUMMARY OF THE INVENTION

Accordingly, the present invention provides a pulsed laser method of defining features on films arranged on substrates.

Another aspect of the present invention provides a pulsed laser method of defining features and/or cutting predetermined substrates.

Accordingly, the present invention provides a short pulse (between about 5 femtoseconds and about 1 picoseconds) laser ablation method that can pattern and/or cut predetermined substrates having high dielectric constants, and customize (i.e., prototype) features of electronic circuits and/or electromechanical assemblies, such as, but not limited to, hybrid wafer scale integration modules for high speed circuit applications, Micro-Electro-Mechanical Systems (MEMs), sensors, electro-optical components, and exploding foil bridge circuits, i.e., chip slappers.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1A:
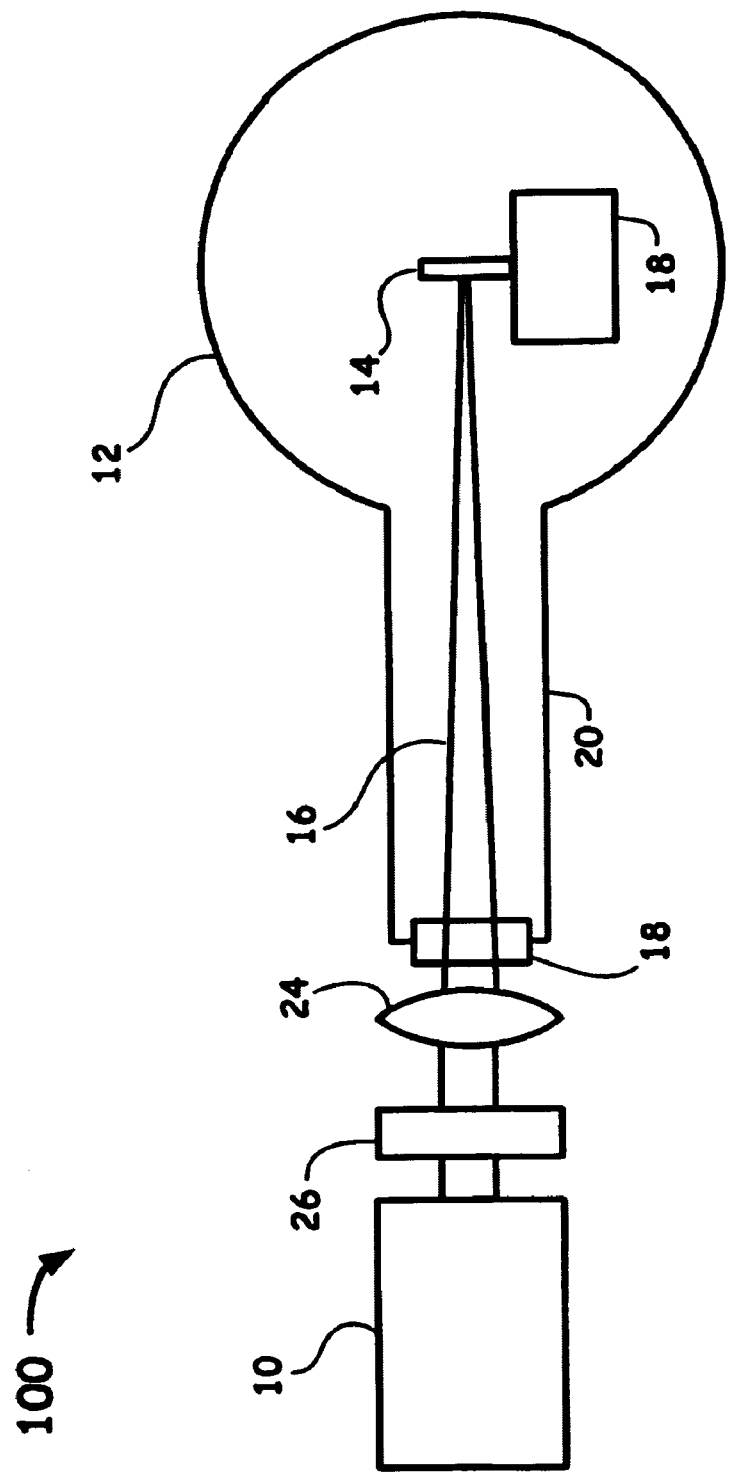
FIG. 1(a) shows a cross-section of a system used to define features on films.

Referring now to the following detailed information, and to incorporated materials; a detailed description of the invention, including specific embodiments, is presented.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

General Description

The present invention provides a pulsed laser ablation method of defining films on substrates and/or defining features or cutting predetermined substrates using a femtosecond laser. Related architecture is disclosed and claimed in U.S. Pat. No. 6,150,630, titled "Laser Machining Of Explosives", by Perry et al., patented Nov. 21, 2000, and is herein incorporated by reference in its entirety.

The present invention uses very short (from about 5 femtoseconds to about 1 picosecond) laser pulses delivered at high repetition rates up to about 50,000 Hz having wavelengths from about 250 nm to about 11 microns, more often at about 810 nm in an atmosphere of less than about 140 mTorr. Very small amounts of material of less than about 1 micron can therefore be removed per laser pulse with extremely small transport of energy either by shock or thermal conduction away from the volume of interest. This offers extremely high precision machining with no heat or shock affected zone. The lack of significant energy deposition beyond the volume of interest achieved by using such ultra-short pulses enables the use of such a high repetition (up to about 50,000 Hz) laser without the need for external cooling of the part being machined.

Cutting or defining features by removing material, such as a metal or a dielectric thin film, with a precision of producing line deviations of less than about 0.1 microns can be achieved with the ultra-short pulses of the present invention because: 1) there is little loss of energy away from the region of interest since thermal conduction during the pulse is negligible and 2) there is no vaporization or transport of material during the pulse. During the pulse, there is insufficient time for hydrodynamic expansion of the vaporized material. As a result, the laser pulse encounters the solid surface for the duration of the pulse, depositing energy directly into the solid and not into a vapor plume. After the pulse is over, a depth of approximately 0.5 microns leaves the surface with an expansion velocity determined by the initial temperature. Typical temperatures in the expanding plasma are between 0.25 and 100 eV and are determined by the product of the incident laser irradiance, $I(W/cm^2)$ and the square of the laser wavelength, $\lambda^2(\mu m)$. The high plasma temperature insures that the vaporized material is completely removed without redepositing on the walls. This material is removed before the arrival of the next laser pulse to enable direct coupling to the solid surface, instead of being absorbed or scattered by an evolving vapor as in conventional systems, which reduces the coupling of the laser light to the solid surface.

By utilizing pulses having a duration from about 5 femtoseconds to about 1 picosecond, extremely precise (e.g., line deviations of less than about 0.1 micron) and rapid machining, such as cutting pr removing material through ablation to define patterns on thin and/or thick films arranged on substrates and/or cutting of the substrate materials themselves can be achieved with essentially no heat or shock affected zone to surrounding areas of predetermined target areas. Such a method enables the present invention to micromachine, for example, hybrid wafer scale integrated modules for high-speed circuitry applications in addition to exploding foil circuits for chip slappers. In addition, high-K dielectric materials (i.e., wafers having a dielectric constant greater than about 3.9), such as, but not limited to Silicon or GaAs wafers with active semi-conductor devices grown into the wafers, can be patterned (i.e., have features defined) or cut with the method of the present invention without damaging the high-K dielectric, which improves the yield and performance of such devices (e.g., MOS devices and storage capacitors).

Furthermore, the present invention is beneficial in micromachining Micro-Electro-Mechanical Systems (i.e., MEMs). (MEMS) is the integration of mechanical elements, sensors, actuators, and electronics on a common substrate, such as silicon, through microfabrication technology. While the electronics are fabricated using integrated circuit (IC) process sequences (e.g., CMOS, Bipolar, or BICMOS processes), the micromechanical components are fabricated using conventional "micromachining" processes that selectively etch away parts of the silicon wafer or add new structural layers to form the mechanical and electromechanical devices. The present invention may be particularly useful in rapidly prototyping such devices by laser machining predetermined features on the wafer or structural layers or films to produce MEMs circuits, such as, but is not limited to: Polymerase Chain Reaction (PCR) microsystems for DNA amplification and identification, Scanning Tunneling Microscopes (STMs), biochips for detection of hazardous chemical and biological agents, microsystems for high-throughput drug screening and selection, high frequency communication circuits; and accelerometers for crash airbag deployment systems in automobiles.

In this method, material is removed by a non-thermal mechanism. A combination of multi-photon and collision ionization creates a critical density plasma in a time scale much shorter than electron kinetic energy is transferred to the lattice. The resulting plasma is far from thermal equilibrium. The material is in essence converted from its initial solid-state directly into a fully ionized plasma on a time scale too short for thermal equilibrium to be established with the lattice. As a result, there is negligible heat conduction beyond the region removed resulting in negligible thermal stress or shock to the material beyond approximately 1 micron from the laser machined surface. The transition to this non-thermal regime depends on the time scale for electrons to transfer their kinetic energy to the lattice and the multi-photon absorption probability of the explosive. This time scale varies slightly with different substrate materials but is typically in the range between about 1 and about 20 picoseconds.

Hydrodynamic expansion of the plasma away from the laser-irradiated surface eliminates the need for any ancillary techniques to remove material and enables the present invention to define precision-machined surfaces and/or patterns on such surfaces. Since there is negligible heating beyond the depth of material removed, the composition of the remaining material is substantially unaffected by the laser machining process of the present invention.

Specific Description

Referring to FIG. 1(a), a system, generally designated as reference numeral 100, for defining a feature in a material, such as a thin and or thick film of at least up to about 5 mm, includes a 3W average power (5.7 GW peak power), less than 150 ps, more often between about 5 femtoseconds and about 1 picosecond, laser system 10 and a vacuum chamber 12 operating at a base pressure of less than about 140 mTorr. Laser 10 is a chirped-pulse-amplification Ti: Sapphire system and arranged with a Ti:Sapphire regenerative amplifier operating at wavelengths from about 250 nm to about 11 microns at about a 50,000 Hz repetition rate to provide a millijoule-level pulse every millisecond. Such a system is described in U.S. Pat. No. 6,150,630, titled "Laser Machining Of Explosives" as discussed above. However, other laser systems capable of producing ultra-short pulses and capable of operating within the design parameters of the present invention may also be incorporated.

Vacuum chamber 12 includes a target 14, such as a thin film (not shown) arranged on a substrate or a substrate itself, oriented up to about a 70-degree angle of incidence that an incident laser beam 16 makes with a normal to target 14. After transmission through an optical window 18 arranged on an input port 20 of vacuum chamber 12 (i.e., a controlled atmosphere), beam 16 illuminates target 14 with a predetermined spot size and with predetermined laser 10 parameters to remove a depth of material per pulse at a targeted ablation zone on the order of less than about 1 micrometer. Target 14 can be translated back and forth during ablation with a speed of up to about 0.5 mm/s provided by a 4-axis multi-axis positioning stage 18. As another arrangement, resonant galvo scanners (not shown) can be adapted to steer laser beam 16 so that in either case, any desired pattern having controlled depths (e.g., to cut) can be defined with beam 16. An example converging optical configuration, such as a 450-mm focal length plano-convex lens 24, is arranged to produce a spot size, often a 200-micron diameter footprint, to generate an optical power density of about 73 $TW/cm^2$, on a predetermined ablation zone (not shown) on target 14 by varying the optical f/#, i.e., by varying the focal length or by translation of convex lens 24 to and from target 14 with the beam waist generally located behind the ablation surface. All of these focusing techniques are well known to those skilled in the art. A beam shuttering means 26, such as an optical or mechanical shutter, can provide a predetermined number of pulses up to the full repetition rate of laser 10 to be selected so as to ablate material from an ablation zone on target 14. Laser beam 16 travel velocity across target 14, beam footprint, pulse repetition rate and laser power is controlled to match a specific material being ablated. Such a laser 10, can also be arranged in different embodiments to produce, for example, linear, circular, or elliptical polarized beam outputs. In addition, the spatial profile of the beam can be altered to produce a predetermined beam shape by using phase plates or by arranging laser system 10 to operate in either a $TEM_{00}$ or to operate with higher transverse modes to create beam shapes that may be desired for a particular application.

Figure 1B:
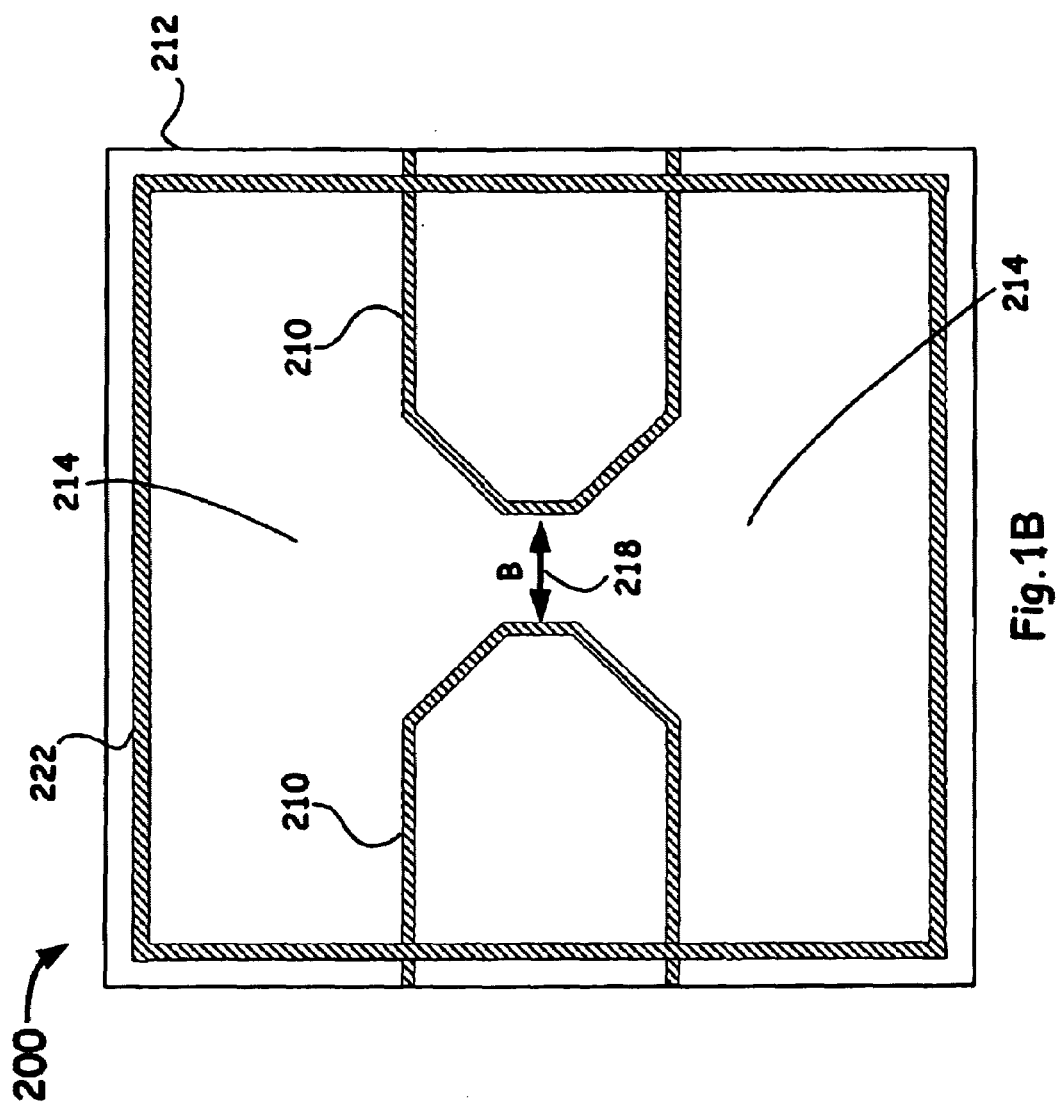
FIG. 1(b) shows an example hybrid integrated module capable of being produced by the present invention.

Such a system 100 can customize circuits for rapid prototype applications by laser machining designed patterns into arranged films on individual dies (i.e., chips) without having to rely on conventional photolithographic techniques. Such patterns can be designed to produce integrated circuits on individual chips, wherein each of the individual chips can be arranged horizontally with a preference to being stacked vertically to form a hybrid-integrated package, wherein the height of a stack of such chips is approximately that of a conventional single chip. FIG. 1(b) shows such an example hybrid integrated module (i.e., package) arrangement capable of being produced by the present invention. As shown in FIG. 1(b), a pattern can be created for an integrated circuit, using the processes disclosed herein that can include, for example, one or more circuit connections 42 interconnected to one or more I/O ports 46, to situate an ASIC 50 and/or one or more laser diodes 54, arranged on a predetermined substrate 58. The stack can be provided with a laser machined patterned overlay produced by system 100 so that circuit connections 42 for each chip can be made from, for example, the upper surface of the stack.

The films of material having a thickness up to about 5 mm can include dielectric coatings, such as but not limited to, silica, ceramics (e.g., alumina), polymides, Kapton or Parylene or any dielectric material capable of being machined by the method of the present invention. In addition, a thin film having a thickness up to about 25 microns and/or a thick film between about 25 microns and about 5 mm can include metals, such as Al (Aluminum), Ga (gallium), In (Indium) or transition metals such as Sc (Scandium), Ti (titanium), V (Vanadium), Cr (chromium), Mn (manganese), Fe (iron), Co (cobalt), Ni (nickel), Cu (Copper), Zn (Zinc), Yt (Yttrrium), Zr (zirconium), Nb (Niobium), Mo (molybdenum), Ru (Ruthenium), Rh (rhodium), Pd (palladium), Ag (Silver), Cd (Cadmium), Hf (hafnium), Ta (tantalum), W (tungsten), Re (Rhenium), Os (Osmium), Ir (Iridium), Pt (platinum), and Au (Gold) and/or may include a lanthanide or actinide metal such as La (lanthanum), Gd (Gadolinium), Nd (neodymium), Sm (Samarium), Ce (Cerium), Er (Erbium), and Yb (Ytterbium). Moreover, the present invention can provide machined or patterned films having less than about 0.1 micron deviations for line structures to be defined on, but not limited to, target substrate materials, such as fused silica, ceramics (e.g., alumina), aluminum nitride, GaAs, Sapphire and Silica or any substrate capable of providing an insulating surface for an applied film.

Figure 2A:
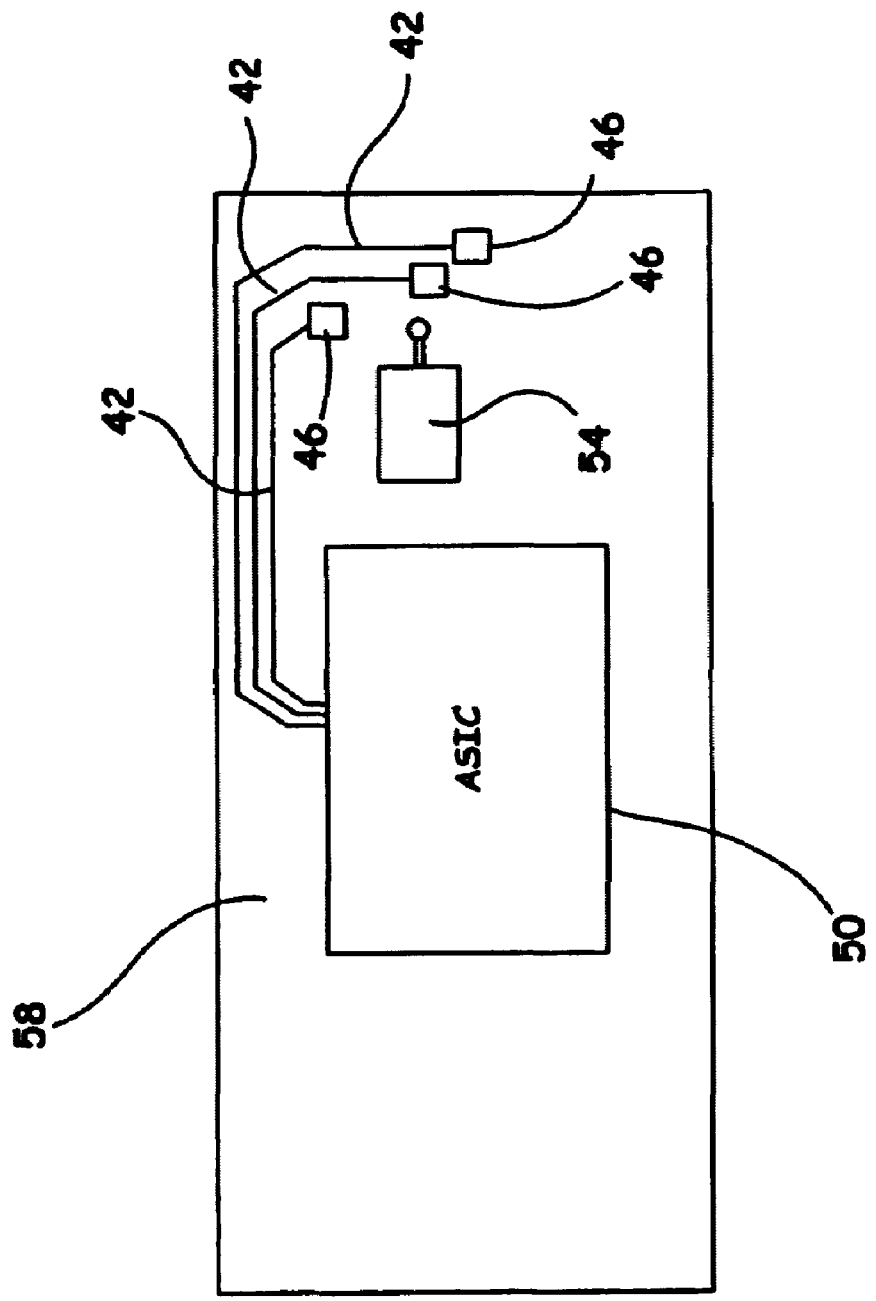
FIG. 2(a) shows an example chip slapper capable of being produced by the present invention.
Figure 2B:
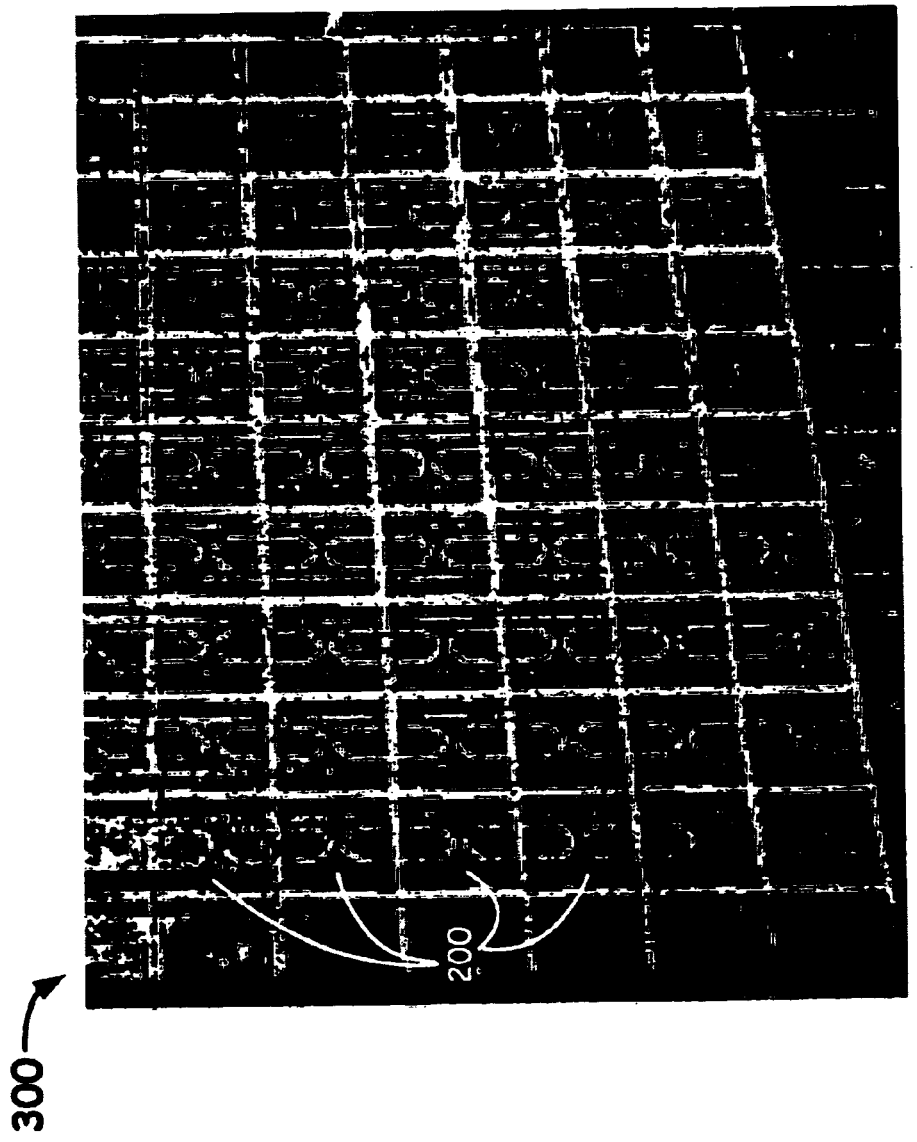
FIG. 2(b) shows a commercial production plate (i.e., a Herman) having a plurality of chip slappers, capable of being produced by the present invention.

FIG. 2(a) illustrates the design of a customized chip slapper circuit capable of being produced by the present invention and is generally designated as reference numeral 200. Typical chip slappers include a ceramic substrate with a deposited film such as copper etched into shaped wide area conductive lands and a narrow bridge portion extending between such lands. A dielectric coating, such as Parylene, is applied over the bridge portion, wherein a small section (i.e., a flying plate) of this dielectric is accelerated away from the substrate and towards an explosive when an applied voltage vaporizes the narrow bridge portion. The shock of such a flying plate detonates an operatively coupled explosive. Such a chip slapper is typically produced by conventional techniques, such as photolithographic methods, to form a plurality of such devices on a commercially supplied production plate (i.e., a Herman). Customized chip slapper 200 produced by the present invention includes a machined dielectric 210 thin film coating of approximately 9 to 11 microns of Paraylene that is arranged to electrically isolate up to about 2.2 microns of copper coated on, for example, an 8.0 mm×8.0 mm ceramic substrate 212. Such a copper coating is designed to provide conductive lands 214 and an electrical bridge 218 defined by a separation region (as denoted by the letter B) between about 2 and about 250 mil separation. Moreover, an outer-machined region 222, for example, a 7.0 mm by 7.0 mm of dielectric material, provides electrical isolation for the specific chip slapper 200 circuit. FIG. 2(b) shows a photographed section of a commercially supplied production plate, such as, for example, a Herman, generally designated as reference numeral 300, having a plurality of customized chip slappers 200, as shown in FIG. 2(a), produced by the present invention.

The experimental parameters are given as an example, but are not intended to limit the scope of the invention. The process is not limited to a vacuum environment. Parameters such as spot size, angle of incidence, laser fluence, laser pulse energy, laser wavelength, distance from target to substrate, etc., can vary from the disclosed embodiments. It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for defining features on films arranged on substrates, comprising:
    providing a substrate having a film arranged on said substrate,
    selectively removing a predetermined depth of said film by directing a plurality of ultra-short laser pulses having a predetermined pulse repetition rate and a predetermined peak power onto a localized ablation zone on said film; and
    directing said plurality of laser pulses onto a plurality of predetermined ablation zones with a precision of producing line deviations of less than about 0.1 microns, wherein said plurality of predetermined ablation zones define a pattern of said film without affecting the material adjacent to said ablation zone.

2. The method of claim 1, wherein said pattern produces an integrated circuit.

3. The method of claim 2, wherein a plurality of said integrated circuits can be arranged to produce a hybrid integrated module.

4. The method of claim 1, wherein said pattern produces a plurality of chip slappers on a Herman.

5. The method of claim 1, wherein said film comprises a dielectric.

6. The method of claim 1, wherein said film comprises a metal.

7. The method of claim 6, wherein said metal includes at least one from: Al (Aluminum), Ga (gallium), and In (Indium).

8. The method of claim 6, wherein said metal includes at least one transition metal selected from: Sc (Scandium), Ti (titanium), V (Vanadium), Cr (chromium), Mn (manganese), Fe (iron), Co (cobalt), Ni (nickel), Cu (Copper), Zn (Zinc), Yt (Yttrrium), Zr (zirconium), Nb (Niobium), Mo (molybdenum), Ru (Ruthenium), Rh (rhodium), Pd (palladium), Ag (Silver), Cd (Cadmium), Hf (hafnium), Ta (tantalum), W (tungsten), Re (Rhenium), Os (Osmium), Ir (Iridium), Pt (platinum), and Au (Gold).

9. The method of claim 6, wherein said metal includes at least one lanthanide or actinide metal selected from: La (lanthanum), Gd (Gadolinium), Nd (neodymium), Sm (Samarium), Ce (Cerium), Er (Erbium), and Yb (Ytterbium).

10. The method of claim 1, wherein said substrate includes a dielectric.

11. The method of claim 1, wherein said substrate is selected from alumina, aluminum nitride, GaAs, Sapphire and silicon.

12. The method of claim 1, wherein said pattern is produced in an atmosphere of less than about 140 mTorr.

13. The method of claim 1, wherein said laser pulses comprise a polarization selected from: circular, elliptical, and linear polarization.

14. The method of claim 1, wherein said pulses include wavelengths between about 250 nm and about 11 microns.

15. A method for defining features and/or cutting substrates, comprising:
   providing a substrate,
   selectively removing a predetermined depth of said substrate by directing a plurality of ultra-short laser pulses having a predetermined pulse repetition rate and a predetermined peak power onto a localized ablation zone on said substrate; and
   directing said plurality of laser pulses onto a plurality of predetermined ablation zones on said substrate with a precision of producing line deviations of less than about 0.1 microns, wherein said plurality of predetermined ablation zones produces a predetermined pattern and/or cuts on said substrate without affecting the material adjacent to said ablation zone.

16. The method of claim 15, wherein said substrate includes a dielectric.

17. The method of claim 16, wherein said substrate includes a material having a dielectric constant greater than about 3.9.

18. The method of claim 15, wherein said pattern is produced in an atmosphere of less than about 140 mTorr.

19. A method for defining features on films arranged on substrates, comprising:
   providing a substrate comprising a film arranged on said substrate, wherein said film can be arranged to comprise at least one lanthanide or actinide metal selected from: La (lanthanum), Gd (Gadolinium), Nd (neodymium), Sm (Samarium), Ce (Cerium), Er (Erbium), and Yb (Ytterbium),
   selectively removing a predetermined depth of said film by directing a plurality of ultra-short laser pulses having a predetermined pulse repetition rate and a predetermined peak power onto a localized ablation zone on said film; and
   directing said plurality of laser pulses onto a plurality of predetermined ablation zones, wherein said plurality of predetermined ablation zones define a pattern of said film without affecting the material adjacent to said ablation zone.

20. The method of claim 19, wherein said pattern produces an integrated circuit.

21. The method of claim 20, wherein a plurality of said integrated circuits can be arranged to produce a hybrid integrated module.

22. The method of claim 19, wherein said film comprises a dielectric.

23. The method of claim 19, wherein said substrate includes a dielectric.

24. The method of claim 19, wherein said substrate comprises at least one substrate selected from alumina, aluminum nitride, GaAs, Sapphire and silicon.

25. The method of claim 19, wherein said pattern is produced in an atmosphere of less than about 140 mTorr.

* * * * *